US006847514B2

(12) United States Patent
Ramarge et al.

(10) Patent No.: US 6,847,514 B2
(45) Date of Patent: Jan. 25, 2005

(54) SURGE ARRESTER MODULE WITH BONDED COMPONENT STACK

(75) Inventors: Michael M. Ramarge, Olean, NY (US); David P. Bailey, Portville, NY (US); Roger S. Perkins, Olean, NY (US); Thomas C. Hartman, Allegany, NY (US); Alan P. Yerges, Muskego, WI (US); Ramon Puyane, Olean, NY (US); David R. Miller, Allegany, NY (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 10/323,677

(22) Filed: Dec. 20, 2002

(65) Prior Publication Data

US 2003/0090850 A1 May 15, 2003

Related U.S. Application Data

(62) Division of application No. 09/432,147, filed on Nov. 2, 1999, now Pat. No. 6,519,129.

(51) Int. Cl.[7] .................................................. H02H 9/00
(52) U.S. Cl. ........................ 361/118; 361/111; 361/127
(58) Field of Search ................................ 361/127, 118, 361/56, 58, 103, 111, 91.1, 119

(56) References Cited

U.S. PATENT DOCUMENTS

| | | | | |
|---|---|---|---|---|
| 4,272,411 A | | 6/1981 | Sokoly et al. | 252/516 |
| 4,282,557 A | | 8/1981 | Stetson | 361/117 |
| 4,296,002 A | | 10/1981 | Sokoly et al. | 252/518.1 |
| 4,352,140 A | * | 9/1982 | Axelsson et al. | 361/127 |
| 4,388,603 A | | 6/1983 | Hassler et al. | 337/158 |
| 4,444,351 A | | 4/1984 | Dries et al. | 228/121 |
| 4,456,942 A | | 6/1984 | Bronikowski | 361/127 |
| 4,729,053 A | | 3/1988 | Maier et al. | 361/118 |
| 4,780,598 A | | 10/1988 | Fahey et al. | 219/511 |
| 4,825,188 A | | 4/1989 | Parraud et al. | 338/21 |
| 4,833,438 A | | 5/1989 | Parraud et al. | 338/21 |
| 4,851,955 A | | 7/1989 | Doone et al. | 361/117 |
| 4,992,906 A | | 2/1991 | Doone et al. | 361/117 |
| 5,003,689 A | | 4/1991 | Doone et al. | 29/613 |
| 5,008,646 A | * | 4/1991 | Hennings et al. | 338/20 |
| 5,159,748 A | | 11/1992 | Doone et al. | 29/613 |
| 5,218,508 A | | 6/1993 | Doone | 361/127 |
| 5,220,480 A | | 6/1993 | Kershaw, Jr. et al. | 361/117 |
| 5,237,482 A | | 8/1993 | Osterhout et al. | 361/117 |
| 5,291,366 A | | 3/1994 | Giese et al. | 361/127 |
| 5,313,184 A | | 5/1994 | Greuter et al. | 338/21 |
| 5,602,710 A | | 2/1997 | Schmidt et al. | 361/127 |
| 5,652,690 A | | 7/1997 | Mansfield et al. | 361/127 |
| 5,923,518 A | | 7/1999 | Hensley | 361/117 |
| 5,930,102 A | | 7/1999 | Rook | 361/127 |
| 5,959,822 A | * | 9/1999 | Bock et al. | 361/117 |
| 5,990,778 A | | 11/1999 | Strümpler et al. | 338/20 |

(List continued on next page.)

FOREIGN PATENT DOCUMENTS

| | | |
|---|---|---|
| DE | 3334533 A1 | 4/1985 |
| EP | 0 642 141 | 3/1995 |
| WO | WO 99/08353 | 2/1999 |
| WO | WO 99/18642 | 4/1999 |

*Primary Examiner*—Stephen W. Jackson
(74) *Attorney, Agent, or Firm*—Fish & Richardson P.C.

(57) ABSTRACT

A surge arrester includes a stack of components having at least one varistor. Each component has end faces, at least one of which is mechanically bonded to an end face of another component such that the combined components of the stack define a single, monolithic structure that serves as both an electrically-active element and a mechanical support element of the surge arrester. The surge arrester also includes an insulative housing surrounding the stack of components. The stack of components is capable of withstanding current pulses having magnitudes of 65 kA and durations of 4/10 microseconds without significant degradation in operating performance of the stack of components.

5 Claims, 9 Drawing Sheets

U.S. PATENT DOCUMENTS 6,008,975 A 12/1999 Kester et al. ............... 361/117
6,008,977 A 12/1999 Thatcher ..................... 361/127
6,279,811 B1 * 8/2001 Ramarge et al. ............ 228/121
6,396,676 B1 5/2002 Doone et al. ............... 361/117

* cited by examiner

SURGE ARRESTER MODULE WITH BONDED COMPONENT STACK

CROSS-REFERENCE TO RELATED APPLICATION

This application is a divisional of application No. 09/432,147, filed Nov. 2, 1999 now U.S. Pat. No. 6,519,129, which is incorporated by reference.

TECHNICAL FIELD

The invention relates to surge arresters and other types of electrical power distribution equipment.

BACKGROUND

Electrical transmission and distribution equipment is subject to voltages within a fairly narrow range under normal operating conditions. However, system disturbances, such as lightning strikes and switching surges, may produce momentary or extended voltage levels that greatly exceed the levels experienced by the equipment during normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

A surge arrester is a protective device that is commonly connected in parallel with a comparatively expensive piece of electrical equipment so as to shunt or divert over-voltage-induced current surges safely around the equipment, thereby protecting the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment.

Upon completion of the over-voltage condition, the surge arrester returns to operation in the high impedance mode. This prevents normal current at the system frequency from following the surge current to ground along the current path through the surge arrester.

Conventional surge arresters typically include an elongated outer enclosure or housing made of an electrically insulating material, a pair of electrical terminals at opposite ends of the enclosure for connecting the arrester between a line-potential conductor and electrical ground, and an array of other electrical components that form a series electrical path between the terminals. These components typically include a stack of voltage-dependent, nonlinear resistive elements, referred to as varistors. A varistor is characterized by having a relatively high resistance when exposed to a normal operating voltage, and a much lower resistance when exposed to a larger voltage, such as is associated with over-voltage conditions. In addition to varistors, a surge arrester also may include one or more spark gap assemblies housed within the insulative enclosure and electrically connected in series with the varistors. Some arresters also include electrically conductive spacer elements coaxially aligned with the varistors and gap assemblies.

For proper arrester operation, contact must be maintained between the components of the stack. To accomplish this, it is known to apply an axial load to the elements of the stack. Good axial contact is important to ensure a relatively low contact resistance between the adjacent faces of the elements, to ensure a relatively uniform current distribution through the elements, and to provide good heat transfer between the elements and the end terminals.

One way to apply this load is to employ springs within the housing to urge the stacked elements into engagement with one another. Another way to apply the load is to wrap the stack of arrester elements with glass fibers so as to axially-compress the elements within the stack.

SUMMARY

In one general aspect, the invention features a surge arrester or surge arrester module having a stack of components including at least one active electrical element, such as a varistor. Each component has end faces, at least one of which is mechanically bonded to an end face of another component such that the combined components of the stack define a single, monolithic structure that serves as both an electrically-active element and a mechanical support element of the surge arrester. The surge arrester also includes an insulative housing surrounding the stack of components. The stack of components is capable of withstanding current pulses having magnitudes of 65 kA and durations of 4/10 microseconds, where 4/10 indicates that a pulse takes 4 microseconds to reach 90% of its peak value and 10 microseconds more to get back down to 50% of its peak value, without significant degradation in operating performance of the stack of components.

Embodiments may include one or more of the following features. For example, the stack of components may be capable of withstanding current pulses having magnitudes of 100 kA and durations of 4/10 microseconds without significant degradation in operating performance of the stack of components.

The stack of components may include a first end component, a second end component, and at least one intermediate component. The first end component may include a first end face mechanically bonded to an end face of an intermediate component, and the second end component may include a first end face mechanically bonded to an end face of an intermediate component. The stack of components may also include a pair of conductive end terminals, with a first terminal being mechanically bonded to a second end face of the first end component and a second terminal being mechanically bonded to a second end face of the second end component.

The stack of components may include two or more varistors, and the varistors may be metal oxide varistors (MOVs). At least a first end face of a first varistor and at least a second end face of a second varistor may be covered with metal coatings. The metal coatings may be coatings of aluminum or brass having thicknesses between 0.002 and 0.010 inches.

The varistors may be formed from ceramic material and mechanical bonding between end faces of two adjacent varistors may be provided by stacking the varistors and heating them together such that the mechanical bond is formed by interaction between the adjacent ceramic end faces. The varistors may be unfired, partially fired, or fully fired before they are stacked and heated together.

Mechanical bonding between end faces of two adjacent varistors may be provided by covering a varistor end face with a bond promoting material. The bond promoting material helps to produce a strong, electrically-conductive bond between the varistors. The bond promoting material may be, for example, a slurry of the ceramic material, an organic adhesive, an inorganic adhesive, a metal-filled glass frit, a solder, or a brazing material.

Mechanical bonding between an end face of a varistor and an adjacent component may be provided by applying a metal layer to the end face and attaching the metal layer to a metal surface of the adjacent component. The metal layer and the metal surface may be attached by soldering or brazing. For example, a solder or brazing material having a melting temperature less than 50° C. more than an expected operating temperature of the surge arrester may be used.

The metal layer and the metal surface may be attached by stacking the varistor and the adjacent component with a preform element between the metal layer of the varistor and the metal surface of the adjacent component, applying pressure to the varistor and the adjacent component, heating the varistor, the adjacent component, and the preform element to melt the preform element, cooling the varistor and the adjacent component, and removing the applied pressure. The preform element may be formed from a solder composition.

The metal layer and the metal surface also may be attached by coating at least one of the metal layer and the metal surface with an epoxy, stacking the varistor and the adjacent component with the epoxy between the metal layer and the metal surface, applying pressure to the varistor and the adjacent component, heating the varistor and the adjacent component to cure the epoxy, cooling the varistor and the adjacent component, and removing the applied pressure.

Another way of attaching the metal layer and the metal surface includes coating the metal layer and the metal surface with a silver-filled glass matrix, stacking the varistor and the adjacent component with the silver-filled glass matrix between the metal layer and the metal surface, and heating the components.

The adjacent component may be a second varistor and the metal surface may be a surface of a metal layer applied to an end face of the second varistor. The adjacent component also may be a conductive metal terminal and the metal surface may be an end face of the conductive metal terminal.

The surge arrester may satisfy the IEEE Standard for Metal-Oxide Surge Arresters (IEEE Std. C62.11-1999), including the standards applicable to distribution surge arresters.

In another general aspect, the invention features joining end faces of two ceramic varistors by applying a metal layer to an end face of a first varistor, applying a metal layer to an end face of a second varistor, and attaching the metal layers. The metal layers may be attached using soldering or brazing. For example, a solder or brazing material having a melting temperature less than 50° C. more than an expected operating temperature of the varistors may be used.

The metal layers may be attached by stacking the varistors with a preform element between the metal layers, applying pressure to the varistors and the preform element, heating the varistors and the preform element to melt the preform element, cooling the varistors and the preform element, and removing the applied pressure. Similarly, they may be attached by coating at least one of the metal layers with an epoxy, stacking the varistors with the epoxy between the metal layers, applying pressure to the varistors, heating the varistors to cure the epoxy, cooling the varistors, and removing the applied pressure. In yet another approach, the metal layers may be attached by coating the metal layers with a silver-filled glass matrix, stacking the varistors with the silver-filled glass matrix between the metal layers, and heating the components.

Other features and advantages will be apparent from the following description, including the drawings and the claims.

DETAILED DESCRIPTION

Figure 1:
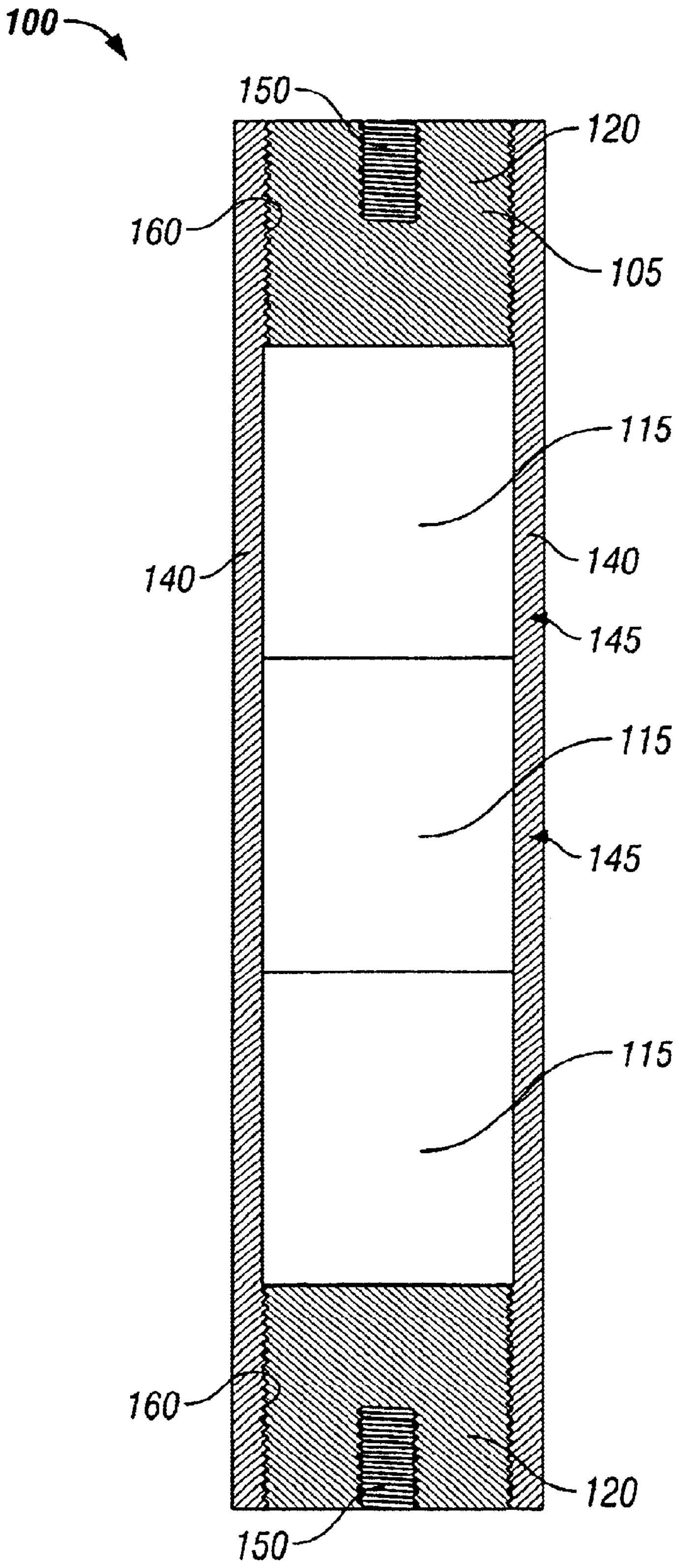
FIG. 1 is a cross-sectional view of a electrical component module.
Figure 2:
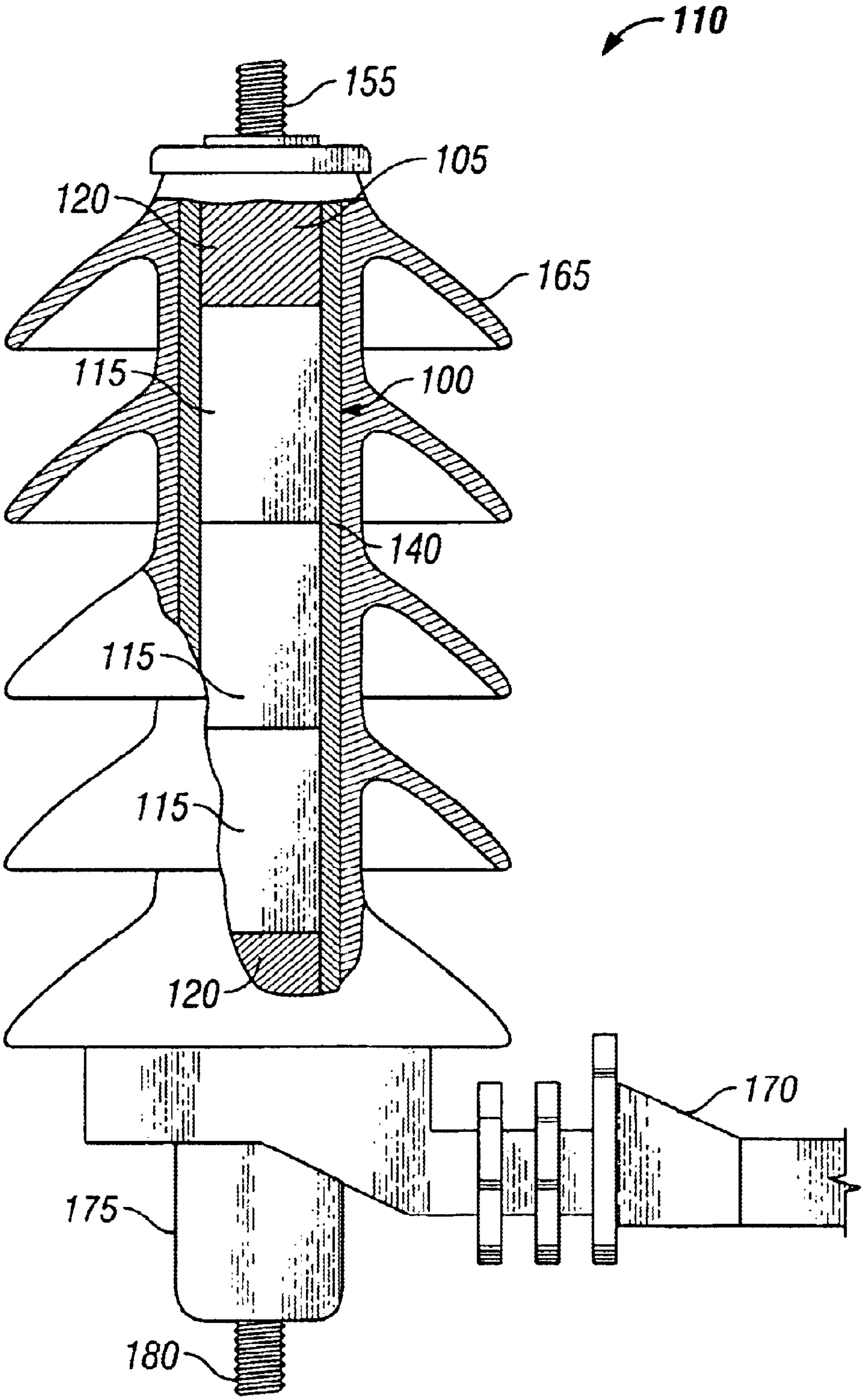
FIG. 2 is a partial cross-sectional view of a surge arrester employing the module of FIG. 1.

Referring to FIGS. 1 and 2, an electrical component module 100 includes a bonded element stack 105 that serves as both the electrically-active component and the mechanical support component of a surge arrester 110. The stack 105 also exhibits high surge durability, in that it can withstand high current, short duration conditions, or other required impulse duties. For example, an implementation of the stack for use in heavy duty distribution arresters has proven capable of withstanding 100 kA pulses having durations of 4⁄10 microseconds, where 4⁄10 indicates that a pulse takes 4 microseconds to reach 90% of its peak value and 10 microseconds more to get back down to 50% of its peak value.

Elements of the bonded element stack 105 are stacked in an end-to-end relationship and bonded together at their end surfaces. Since the elements of the stack 105 are affirmatively bound together, the arrester 110 does not need to include a mechanism or structure for applying an axial load to the elements.

The surge arrester 110 may be implemented as a distribution class surge arrester, such as a 10 kA heavy duty 10 kV (8.4 kV Maximum Continuous Operating Voltage) arrester. It should be understood, however, that the module 100 may be used in other types of surge arresters, and in other electrical protective equipment.

The bonded element stack 105 may include different numbers of elements, and elements of different sizes or types. Examples include varistors, capacitors, thyristors, thermistors, and resistors. For purposes of explanation, the stack is shown as including three metal oxide varistors ("MOVs") 115 and a pair of terminals 120.

Figure 3:
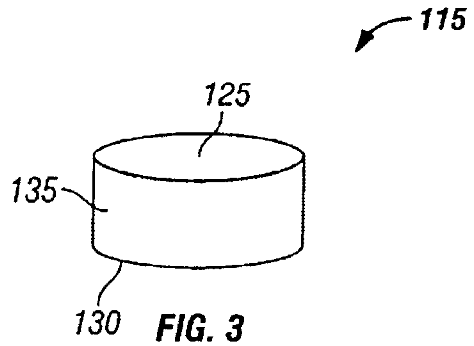
FIG. 3 is a perspective view of a MOV device of the module of FIG. 1.

Referring also to FIG. 3, each MOV 115 is made of a metal oxide ceramic formed into a short cylindrical disk having an upper face 125, a lower face 130, and an outer cylindrical surface 135. The metal oxide used in the MOV 115 may be of the same material used for any high energy, high voltage MOV disk, such as a formulation of zinc oxide. Such a formulation is described, for example, in U.S. Pat. No. 3,778,743, which is incorporated by reference.

The MOVs may be sized according to the desired application. For example, in one set of implementations, the MOV may have a diameter between approximately 1 to 3 inches, such that the upper and lower faces 125, 130 each have surface areas of between about 0.785 and 7.07 square inches.

Given a particular metal oxide formulation and a uniform or consistent microstructure throughout the MOV, the thickness of the MOV determines the operating voltage level of the MOV. In one implementation, each MOV is about 0.75 inches thick. In some implementations, this thickness may be tripled.

It is desirable to minimize the cross-sectional areas of the MOVs so as to minimize the size, weight and cost of the arrester. However, the durability and recoverability of the MOVs tend to be directly related to the sizes of the MOVs. In view of these competing considerations, MOVs having diameters of approximately 1.6 inches have been used.

The upper and lower faces 125, 130 may be metallized using, for example, sprayed-on coatings of molten aluminum or brass. In some implementations, these coatings have thicknesses of approximately 0.002 to 0.010 inches. The outer cylindrical surface 135 is made up of the metal oxide formulation. In other implementations, the surface 135 may be covered by an insulative collar.

As shown in FIGS. 1 and 2, the module 100 includes an insulative coating 140 covering the circumferential sides of the stack 105. The insulative coating is made thin enough to permit the stack to vent gas that may evolve during arrester component failure. In particular, when an MOV 115 or other internal component of the stack fails, pressure within the insulative coating 140 will build as the internal arc burns adjacent materials. The pressure will increase until it reaches a magnitude that causes the insulative coating to burst, so as to relieve the internal pressure and vent the evolved gas.

A terminal 120 is disposed at each end of the stack 105. Each terminal 120 is a relatively short, cylindrical block formed from a conductive material, such as, for example, aluminum. Each terminal 120 has a diameter substantially equal to that of an MOV 115. In some implementations, each terminal may also include a threaded bore 150 in which may be positioned a threaded conductive stud 155. An outer cylindrical surface 160 of a terminal may be knurled, ribbed, or otherwise textured to improve adherence to the insulative coating 140.

In general, the terminals 120 may be thinner than terminals associated with modules that, for example, are wrapped with a structural layer to provide an axial load on the components of the module. This reduced thickness may result from changes in the geometry of the device, or simply because thicker metal is not needed for bonding with the structural layer.

As shown in FIG. 2, the surge arrester 110 includes the electrical component module 100, a polymeric housing 165, and an arrester hanger 170. The module 100 is disposed within the polymeric housing 165. An insulating or dielectric compound (not shown), such as room temperature vulcanized silicone, fills any voids between the module 100 and the inner surface 175 of the housing 165. A threaded conductive stud 155 is disposed in the bore 150 of each terminal 120. The upper stud 155 extends through the housing 165 and includes threads for engaging a terminal assembly (not shown). The lower stud 155 extends through an aperture (not shown) in hanger 170 for connection to a ground lead disconnector 175. A threaded stud 180 extends from the disconnector 175 to engage a ground lead terminal assembly (not shown). The housing 165 is sealed about the upper and lower ends of the module 100.

As noted above, elements of the bonded element stack 105 are bonded together at their end surfaces, such that the stack 105 serves as both the electrically-active component and the mechanical support structure of an electrical protective device such as the surge arrester 110. This bonding may involve ceramic-to-ceramic bonding between, for example, faces of adjacent MOVs; ceramic-to-metal bonding between, for example, an MOV and a terminal; and metal-to-metal bonding between, for example, a terminal and a component having a metal face, such as a spark gap assembly. The bonding must provide bonds that are both mechanically stable and electrically conductive.

Ceramic-to-ceramic bonding may include ceramic-to-bonding agent-to-ceramic bonding, cofiring, and refiring. Suitable bonding agents include, for example, organic adhesives, and inorganic adhesives. Cofiring includes firing two or more unfired MOVs together in a kiln to form a bond between the MOVs. This bond may be enhanced by providing a bond promoting material, such as, for example, an MOV slurry, between the unfired MOVs. Refiring includes firing two or more previously-fired MOVs together in a kiln, in the presence of a layer of bond promoting material between the MOVs. In both cofiring and refiring, heating of the layer of bond promoting material between the components helps to produce a strong, electrically-conductive bond between the components.

Ceramic-to-metal bonding may include applying a metal layer to a ceramic surface (e.g., the face of an MOV) using, for example, arc spraying or silk screening. This metal layer then may be attached, for example, to the face of a terminal using, for example, solder. In some implementations, the face of the terminal is attached directly to the ceramic surface by, for example, soldering or brazing directly to the ceramic surface. Such direct soldering or brazing also may be used to attach two ceramic surfaces to each other.

When using solder, it is desirable to use low temperature solders, so as to avoid heating the MOV disks to temperatures that can damage the disks. This also tends to avoid the need for special fluxes, which can potentially attack the material from which the MOV disks are formed. In some circumstances, it also is useful to perform the soldering in a reducing atmosphere. However, this also has the potential to degrade the materials from which the disks are formed.

Another potential problem associated with using low temperature solders is that, in some cases, the solder temperature (e.g., 221° Celsius) can approach the operating temperature (e.g., 200° Celsius), which can lead to partial melting of the solder and potential device failure under extreme operating conditions. This problem may be avoided by selecting a solder having a solder temperature that differs sufficiently from the operating temperature, while not being too high.

Other techniques for attaching a metal to a ceramic surface include the use of an organic adhesive, such as a metal-filled epoxy; an inorganic adhesive; or brazes. Each of these techniques can be performed with or without metallized faces being deposited on the ceramic surfaces. When metallized faces are deposited on both ceramic surfaces, bonding of the metallized faces constitutes metal-to-metal bonding.

Figure 4:
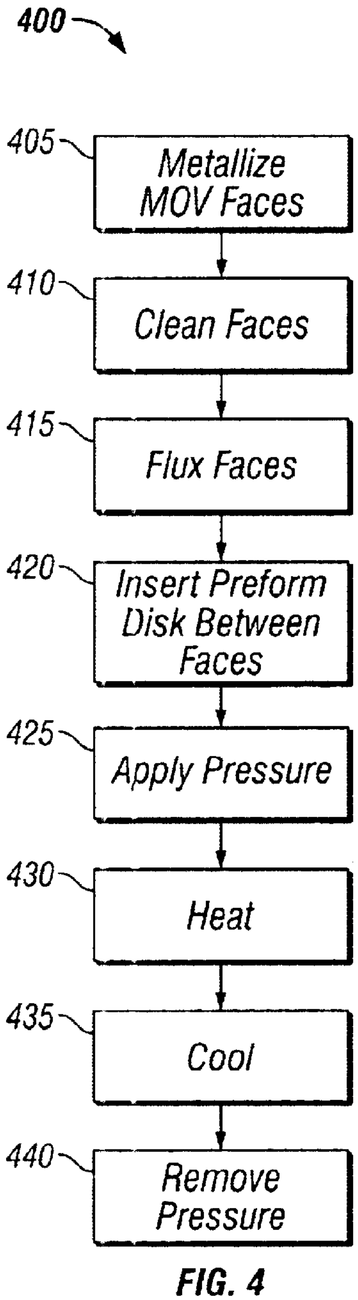
FIGS. 4–7 are flow charts of procedures for use in bonding components of an electrical component module.

Referring to FIG. 4, ceramic-to-ceramic bonding between the faces of adjacent MOVs may be achieved according to a procedure 400. Initially, MOV faces to be bonded are metallized by applying a thin layer of brass (step 405). The brass may be applied by arc spraying, and typically has a thickness of approximately 0.002 to 0.010 inches. After the metallized layers are applied, their outer surfaces are cleaned with an alcohol or a mild acid solution to remove any dust or other contaminants (step 410). The metallized layers then are lightly fluxed to promote melting and remove oxide layers (step 415). Next, a preform disk is placed between each pair of metallized layers to be bonded (step 420) and pressure is applied to the outer end faces of the stack of components being bonded (step 425). In one implementation, the preform disk is 0.005 inches thick, and is formed from a solder composition including 96.5% tin and 3.5% silver. The pressure applied to the end faces of the stack may be, but is not restricted to, between about 25 and 100 pounds per square inch. Once pressure is applied, the stack is heated to melt the preform disk or disks (step 430). For example, in one implementation, the stack is heated to about 235° Celsius for about one hour. The stack then is cooled to bond the components together (step 435), and pressure is removed (step 440).

Figure 5:
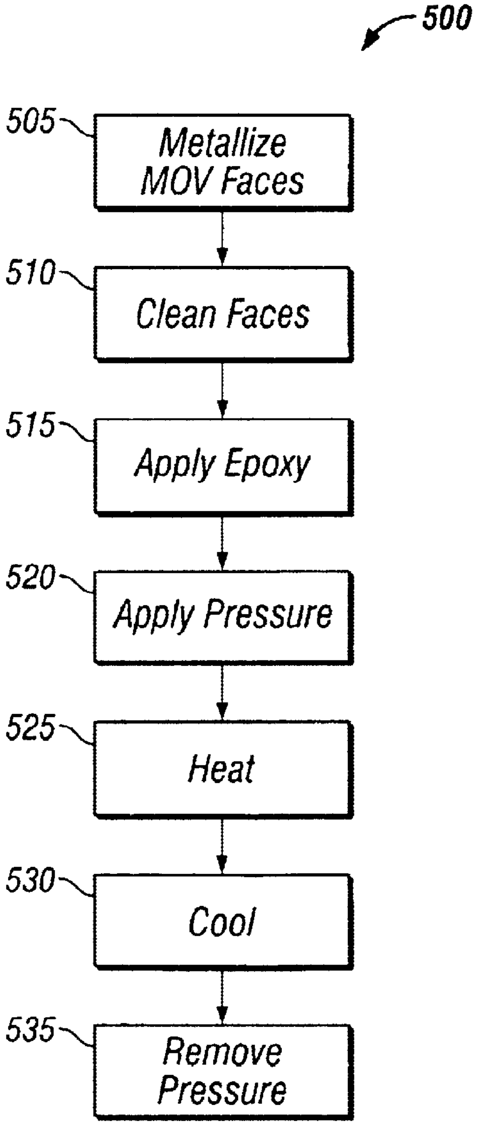

Referring to FIG. 5, ceramic-to-ceramic bonding between the faces of adjacent MOVs also may be achieved according to a procedure 500. Initially, MOV faces to be bonded are metallized by applying a thin layer of aluminum or brass (step 505). The outer surfaces of the metallized layers then are cleaned with an alcohol or a mild acid solution (step 510). Next, a thin layer of silver-filled epoxy is applied between the metallized layers (step 515). Pressure then is applied to the outer faces of the stack (step 520), and the stack is heated (step 525). As in the procedure 400, the pressure applied to the stack may be between about 25 and 100 pounds per square inch. The stack is heated to about 190° Celsius for about one hour to cure the epoxy resin. The stack then is cooled (step 530), and pressure is removed (step 535).

Figure 6:
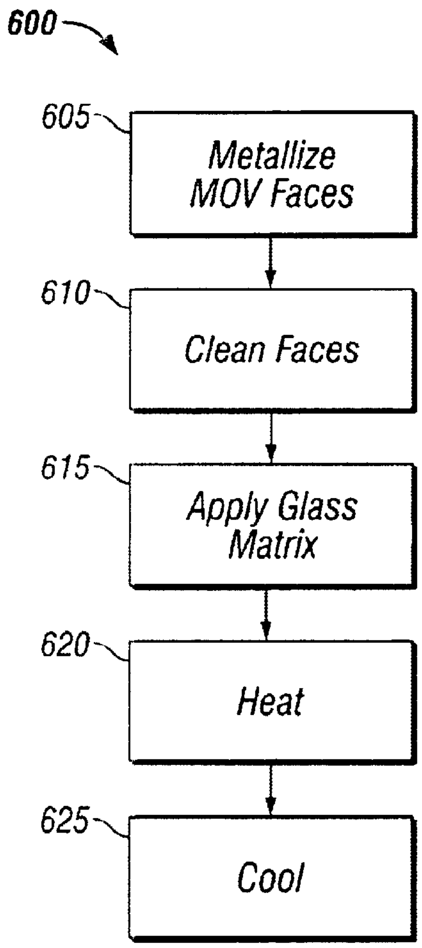

Referring to FIG. 6, ceramic-to-ceramic bonding between the faces of adjacent MOVs also may be achieved according to a procedure 600. Initially, MOV faces to be bonded are metallized by applying a thin layer of aluminum or brass (step 605). The outer surfaces of the metallized layers then are cleaned with an alcohol or a mild acid solution (step 610). Next, top and base coat layers of silver-filled glass matrix are applied to the metallized layers (step 615). The stack then is heated (step 620). In particular, the stack is heated to about 750° Celsius for about one hour. The stack then is cooled to bond the components together (step 625).

Figure 7:
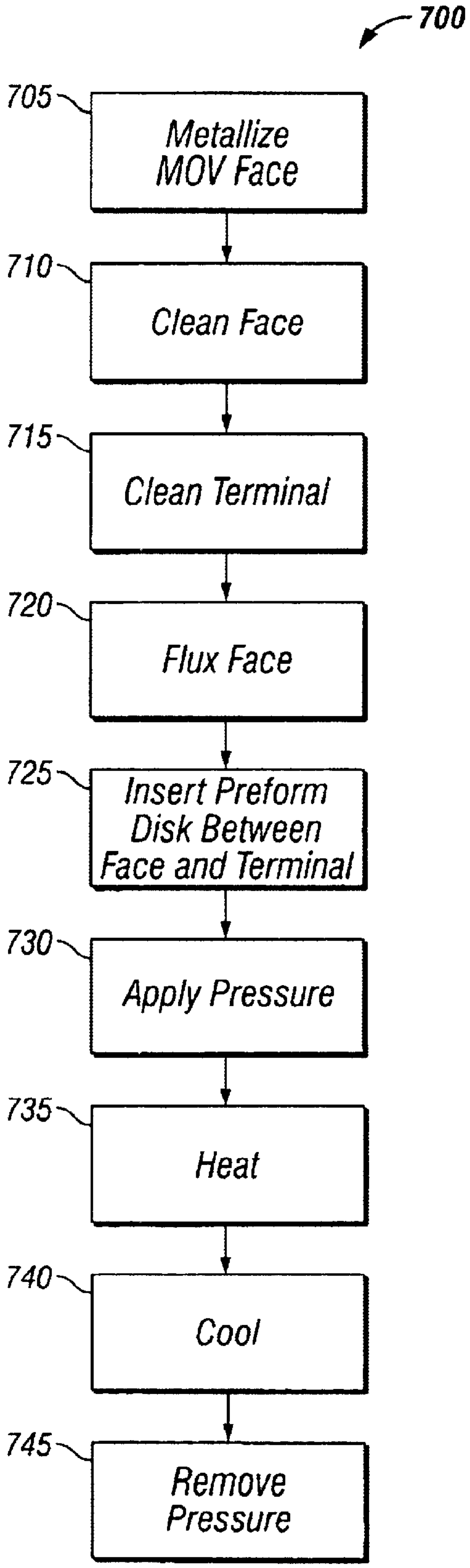

Referring to FIG. 7, ceramic-to-metal bonding between the face of an MOV and, for example, the face of a terminal may be achieved according to a procedure 700. Initially, the MOV face to be bonded is metallized by applying a thin layer of brass or another metal (step 705). After the metallized layer is applied, its exposed surface is cleaned with an alcohol or a mild acid solution to remove any dust or other contaminants (step 710), and the surface of the terminal is similarly cleaned (step 715). Typically, the terminal is made from an iron-nickel composition having a coefficient of thermal expansion similar to that of the MOV. By contrast, problems can result when the terminal is made from another metal, such as aluminum, having a coefficient of thermal expansion substantially different from that of the MOV. The metallized layer then is lightly fluxed (step 720). Next, a preform disk is placed between the terminal face and the metallized layer to be bonded (step 725) and pressure is applied to the outer end faces of the stack of components being bonded (step 730). In one implementation, the preform disk is 0.005 inches thick, and is formed from a solder composition including 96.5% tin and 3.5% silver. The pressure applied to the end faces of the stack may be between about 25 and 100 pounds per square inch. Once pressure is applied, the stack is heated to melt the preform disk (step 735). For example, in one implementation, the stack is heated to about 235° Celsius for about one hour. The stack then is cooled to bond the components together (step 740), and pressure is removed (step 745). It will be appreciated that the procedure 700 may be performed in parallel with the procedure 400, so as to generate a stack including MOVs and terminals in a single pass.

The procedures illustrated in FIGS. 4–7, and the particular implementations described, have been found to produce component stacks capable of satisfying standards, such as the IEEE Standard for Metal-Oxide Surge Arresters (IEEE Std. C62.11-1999), including the standards applicable to distribution surge arresters. This standard states that such a surge arrester must be capable of withstanding successive current pulses having magnitudes of 65 kA and higher. Details of the test performed to ensure compliance with this standard are set forth in section 8.10 of the standard, under the heading "Discharge-Current Withstand Tests".

The standard also states that such arresters must endure environmental tests related to accelerated aging by exposure to electrical stresses and external contamination as set forth in sections 8.6.2 and 8.7 of the standard under the headings "Accelerated Aging Tests by Exposure to Electrical Stress" and "Contamination Test". The described embodiments have demonstrated improved performance under these tests as indicated by required endurance with reduced overall electrical activity and surface currents (watts loss).

Figure 8:
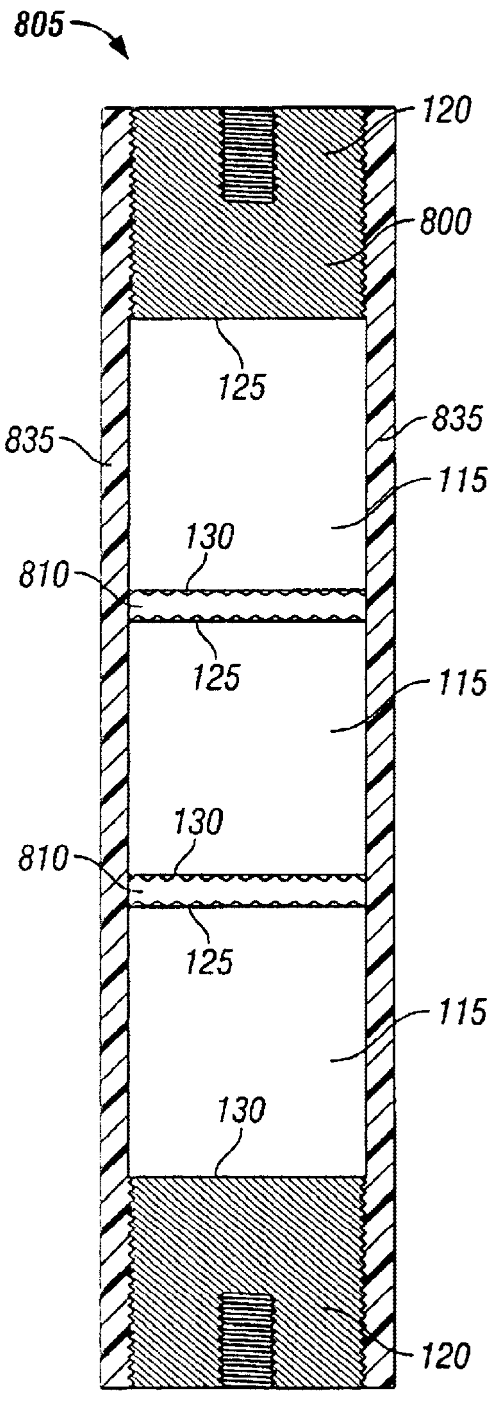
FIG. 8 is a cross-sectional view of a second electrical component module.
Figure 9:
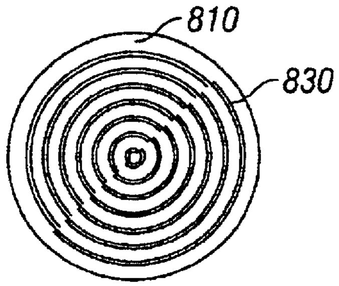
FIG. 9 is a top view of a grooved electrode of the module of FIG. 8.
Figure 10:
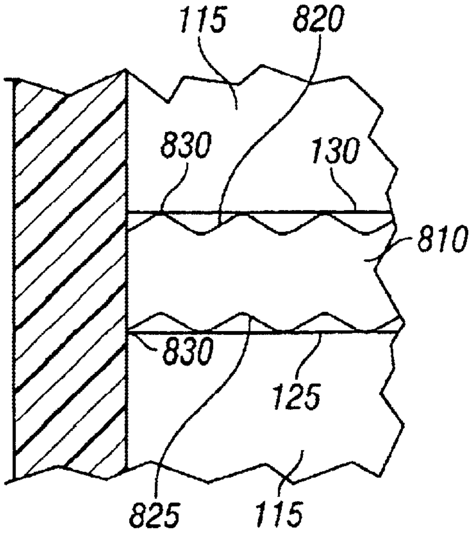
FIG. 10 is an enlarged view of a portion of the module of FIG. 8.

Other embodiments are within the scope of the following claims. For example, referring to FIGS. 8–10, a bonded element stack 800 of a module 805 may include contact plates 810 disposed between upper and lower faces 125, 130 of adjacent MOVs 115. A contact plate 810 is formed as a metallic disk having an outer edge 815 and an outer diameter approximately equal to that of an MOV. The contact plate also includes upper and lower ridged surfaces 820, 825, which generally take the form of concentric grooves such that an outermost ridge 830 is formed on each of the upper and lower surfaces 820, 825. The contact plate may be formed from annealed aluminum, brass, or some other conducting metal.

In some implementations, an insulative coating 835 may be bonded to the bonded element stack 800 to prevent the undesired entry of moisture or other contaminants into the module 805. The coating 835 also may provide increased tensile and mechanical strength to the module, as well as controlled venting of gases during an arrester failure.

Figure 11:
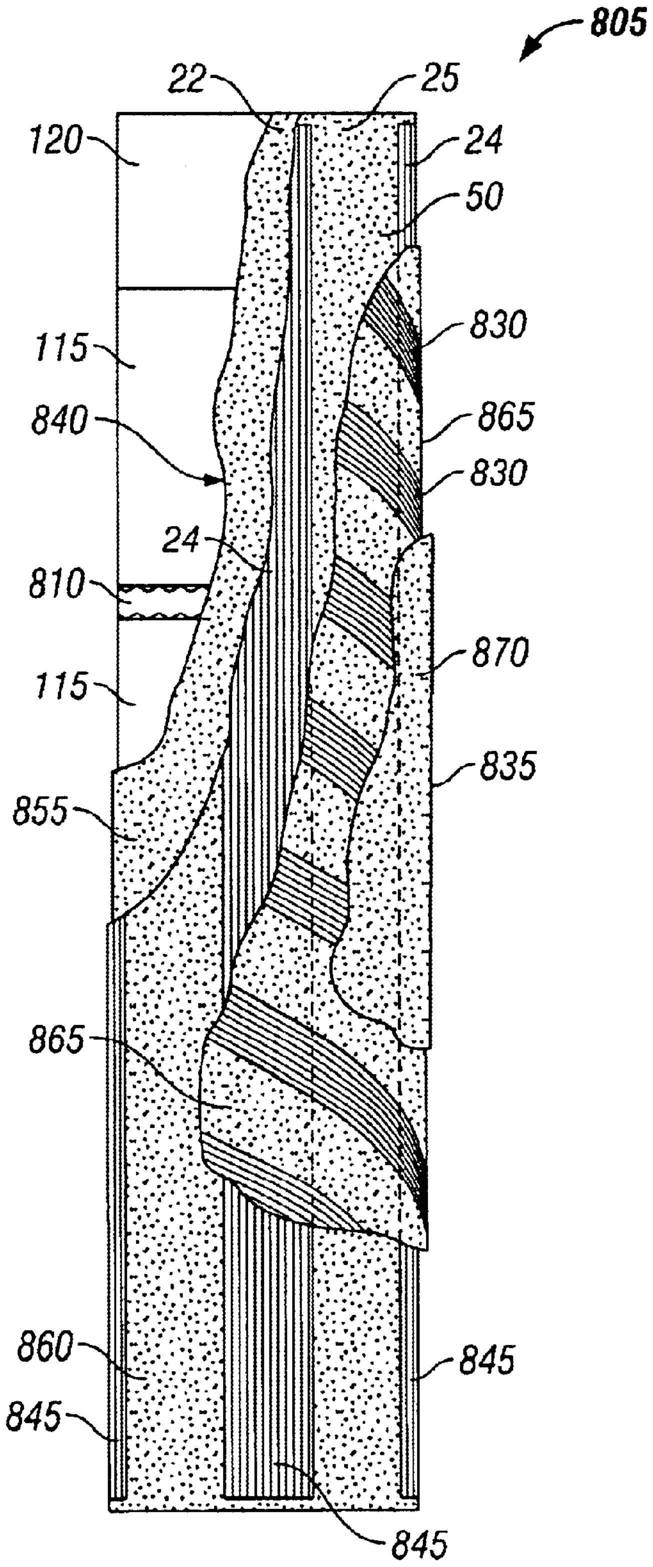
FIG. 11 is an elevational view of the module of FIG. 8 shown with layers of the insulative coating partially cut away.
Figure 12:
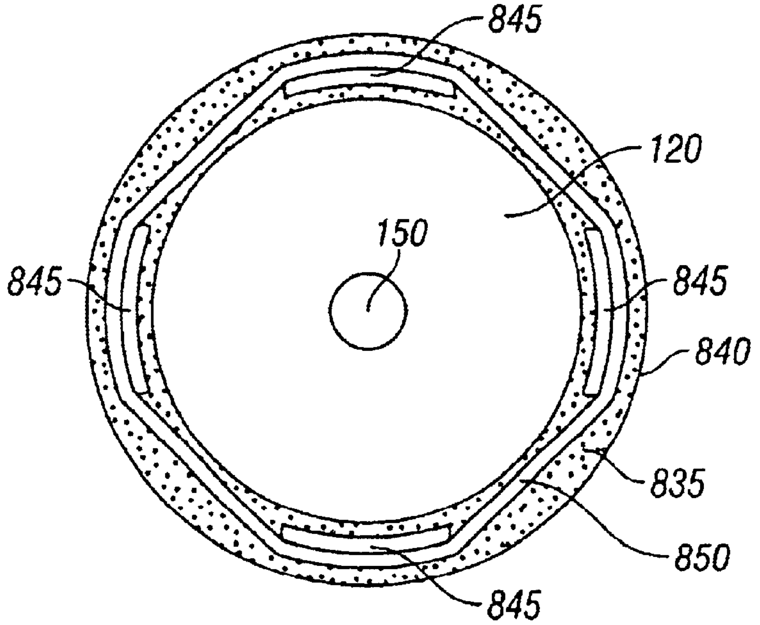
FIG. 12 is a top view of the module of FIG. 8.

Referring now to FIGS. 11 and 12, the coating 835 includes a matrix 840 of resinous layers, axially aligned fibrous tape segments 845, and a spiral-wrapped fibrous tape segment 850, with the segments 845 and 850 being embedded within the matrix. The matrix may include a base resinous layer 855 and three outer resinous layers 860–870. Resinous layers 855–870 are thermosetting resins selected from among the following: polyester resins, phenolic resins and epoxy resins. The resin also may include a flameout ingredient and particle fillers to control consistency, aid in modifying the thermal expansion coefficient, and increase tensile strength.

Resin layers 860–870 may include a single resin formulation, or they may include two to four different resins. The resins used for layers 855–870 are selected so as to have similar cure temperatures and so as to be mutually compatible with the other resin layers making up the matrix 840. Further, the resin of matrix 840 must be stable at high temperatures and high voltages, meaning that the cured resins in matrix 840 must not depolymerize or lose bonding strength at the temperatures and voltages to which the components in the module 805 will be subjected during operation. Normal operating temperatures are typically between −60 and +60° Celsius. Failure mode temperatures can be as high as 350° Celsius. The material selected for layers 855–870 undergoes no thermal degradation at or below the failure temperature of the electrical equipment.

It is important that the insulative coating 835, when cured, have a coefficient of thermal expansion that is greater than the coefficient of thermal expansion of the electrical components of the stack 800. This will ensure that, at any temperature below its cure temperature, coating 835 will exert axially and radially compressive forces on the stack 800. The components in stack 800 typically have an average coefficient of thermal expansion in the range of $5*10^6$ inches/° C. to $25*10^6$ inches/° C., so it is desired that the coating 835 be formed from materials having a coefficient of thermal expansion of at least $50*10^6$ inches/° C. to $250*10^6$ inches/° C.

Details regarding formulation of an insulative coating, such as the insulative coating 835, are described in U.S. application Ser. No. 09/142,076, titled "Polymeric Weathershed Surge Arrester and Method" and filed Sep. 1, 1998, which is incorporated by reference.

Figure 13:
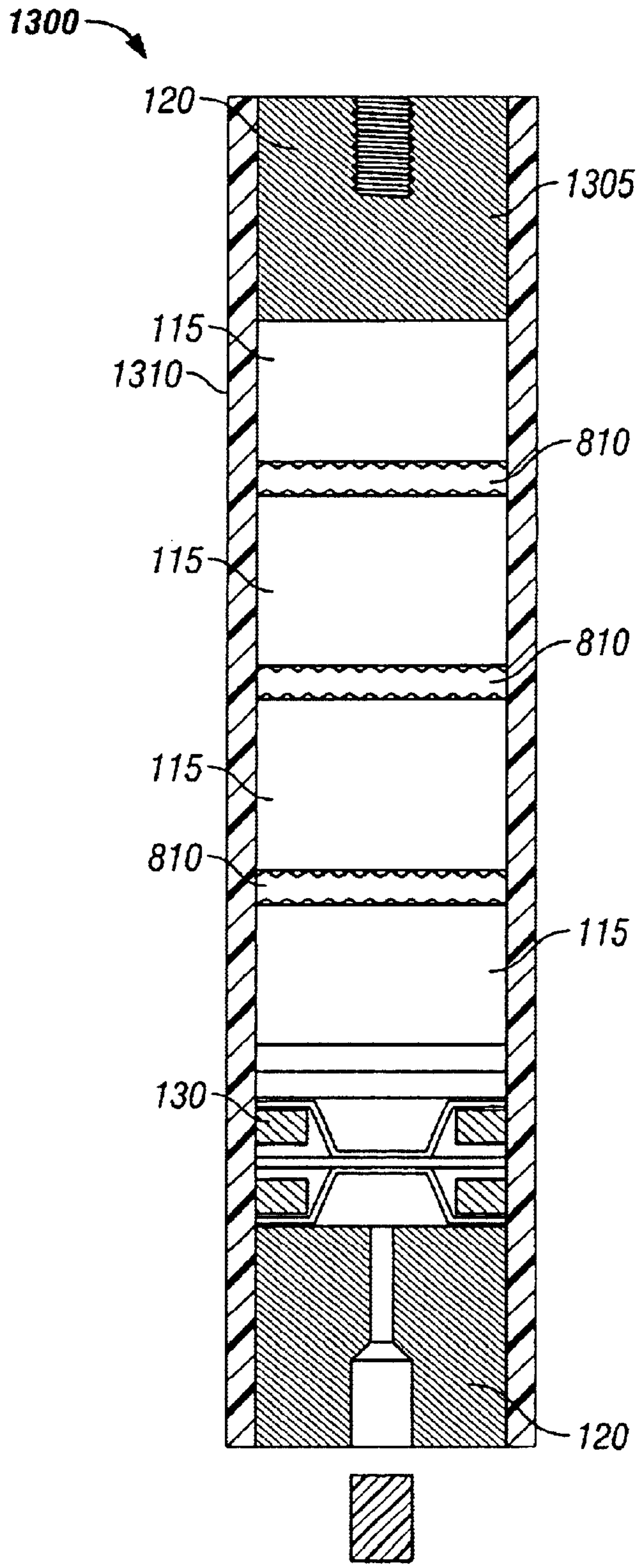
FIG. 13 is a cross-sectional view of a third electrical component module.

Referring now to FIG. 13, a module 1300 includes a electrical component stack 1305 having MOVs 115, contact plates 810, and terminals 120, all as previously described. The module also includes one or more spark gap assemblies 1305, and an insulative coating 1310.

Figure 14:
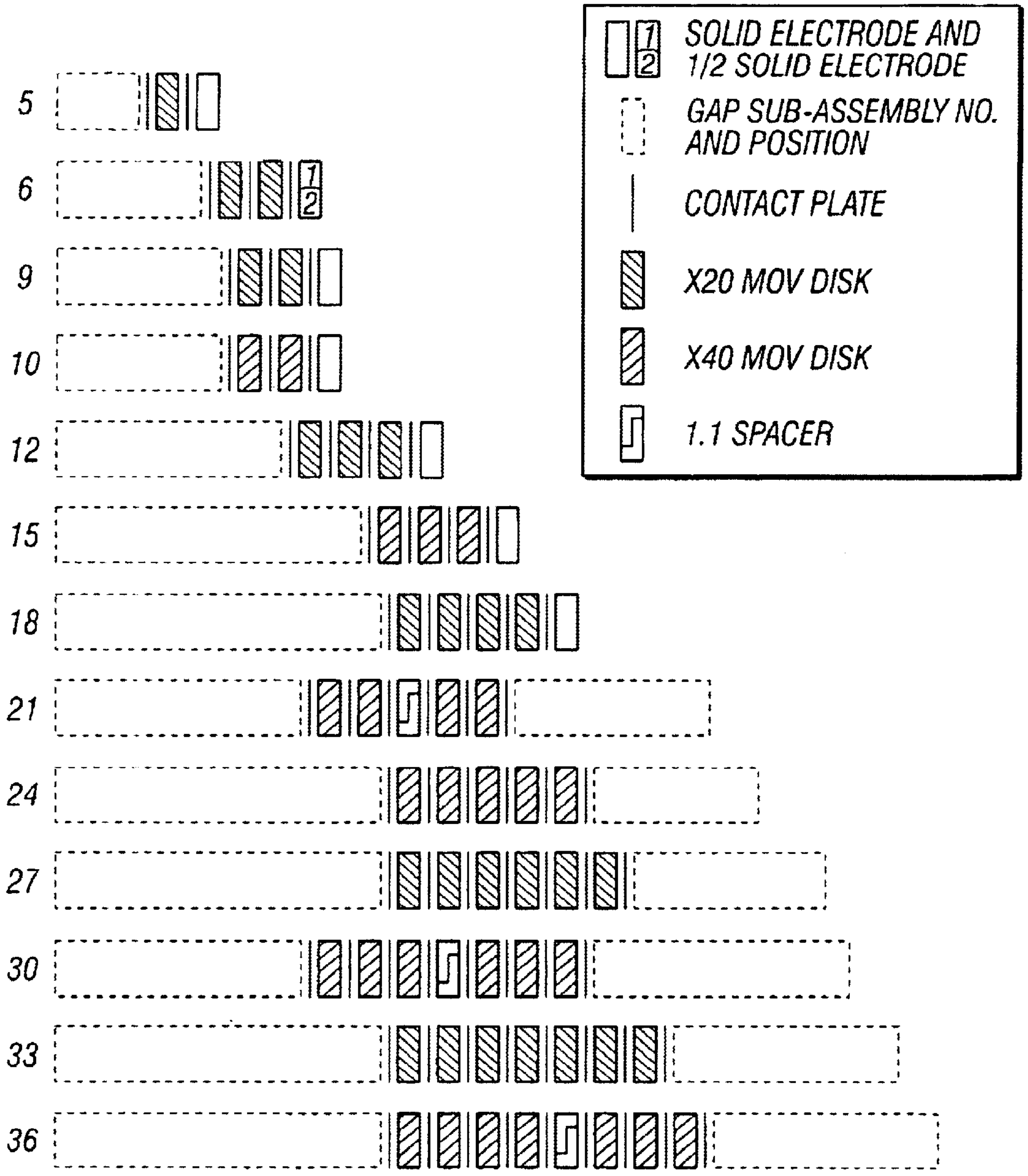
FIG. 14 shows alternative arrays of components that can be used in electrical component modules.

As noted above, the various electrical component stacks may include other than three MOV devices. Examples of other arrangements of electrical components are illustrated in FIG. 14, where the illustrated contact plates are optional in all circumstances.

What is claimed is:

1. A method of joining end faces of two ceramic varistors, the method comprising:

applying a metal layer to an end face of a first varistor;

applying a metal layer to an end face of a second varistor; and attaching the metal layers to each other using soldering or brazing, the soldering or brazing comprising using a material different from a material from which one of the metal layers is formed.

2. A method of joining end faces of two ceramic varistors, the method comprising:

applying a metal layer to an end face of a first varistor;

applying a metal layer to an end face of a second varistor; and attaching the metal layers to each other using soldering or brazing, wherein attaching the metal layers to each other using soldering or brazing comprises using a solder or brazing material having a melting temperature less than 50° C. more than an expected operating temperature of the varistors.

3. A method of joining end faces of two ceramic varistors, the method comprising:

applying a metal layer to an end face of a first varistor;

applying a metal layer to an end face of a second varistor; and attaching the metal layers by:

stacking the varistors with a preform element between the metal layers;

applying pressure to the varistors and the preform element;

heating the varistors and the preform element to melt the preform element;

cooling the varistors and the preform element; and removing the applied pressure.

4. A method of joining end faces of two ceramic varistors, the method comprising:

applying a metal layer to an end face of a first varistor;

applying a metal layer to an end face of a second varistor; and attaching the metal layers by:

coating at least one of the metal layers with an epoxy;

stacking the varistors with the epoxy between the metal layers;

applying pressure to the varistors;

heating the varistors to cure the epoxy;

cooling the varistors; and removing the applied pressure.

5. A method of joining end faces of two ceramic varistors, the method comprising:

applying a metal layer to an end face of a first varistor;

applying a metal layer to an end face of a second varistor; and attaching the metal layers by:

coating the metal layers with a silver-filled glass matrix;

stacking the varistors with the silver-filled glass matrix between the metal layers; and heating the components.

* * * * *